US010504000B2

(12) United States Patent
Heinly et al.

(10) Patent No.: US 10,504,000 B2
(45) Date of Patent: Dec. 10, 2019

(54) METHODS, SYSTEMS, AND COMPUTER READABLE MEDIA FOR IMAGE OVERLAP DETECTION

(71) Applicant: The University of North Carolina at Chapel Hill, Chapel Hill, NC (US)

(72) Inventors: Jared Scott Heinly, Chapel Hill, NC (US); Johannes Lutz Schoenberger, Chapel Hill, NC (US); Enrique Dunn, Chapel Hill, NC (US); Jan-Michael Frahm, Chapel Hill, NC (US)

(73) Assignee: THE UNIVERSITY OF NORTH CAROLINA AT CHAPEL HILL, Chapel Hill, NC (US)

( * ) Notice: Subject to any disclaimer, the term of this patent is extended or adjusted under 35 U.S.C. 154(b) by 0 days.

(21) Appl. No.: 15/561,195

(22) PCT Filed: Mar. 24, 2016

(86) PCT No.: PCT/US2016/024118
§ 371 (c)(1),
(2) Date: Sep. 25, 2017

(87) PCT Pub. No.: WO2016/154499
PCT Pub. Date: Sep. 29, 2016

(65) Prior Publication Data
US 2018/0082147 A1    Mar. 22, 2018

Related U.S. Application Data

(60) Provisional application No. 62/137,870, filed on Mar. 25, 2015.

(51) Int. Cl.
*G06K 9/62*    (2006.01)
*G06F 17/30*    (2006.01)
(Continued)

(52) U.S. Cl.
CPC .......... *G06K 9/6202* (2013.01); *G06F 16/00* (2019.01); *G06F 16/51* (2019.01);
(Continued)

(58) Field of Classification Search
CPC .. G06K 9/6202; G06K 9/6218; G06K 9/4671; G06K 9/00677; G06K 9/00201;
(Continued)

(56) References Cited

U.S. PATENT DOCUMENTS

| | | | | |
|---|---|---|---|---|
| 8,352,494 B1 * | 1/2013 | Badoiu | ................. | G06F 16/532 |
| | | | | 707/772 |
| 8,438,163 B1 * | 5/2013 | Li | ...................... | G06K 9/00536 |
| | | | | 707/737 |

(Continued)

FOREIGN PATENT DOCUMENTS

WO    WO 2014/152601 A1    9/2014

OTHER PUBLICATIONS

Notification of Transmittal of the International Search Report and the Written Opinion of the International Searching Authority, or the Declaration for International Application No. PCT/US2016/024118 (dated Aug. 18, 2016).

(Continued)

*Primary Examiner* — Bobbak Safaipour
(74) *Attorney, Agent, or Firm* — Jenkins, Wilson, Taylor & Hunt, P.A.

(57) ABSTRACT

Methods, systems, and computer readable media for image overlap detection. An example method includes identifying, by one or more computers, a collection of images; streaming, by the one or more computers, each image from the collection of images so that, in one or a limited number of passes through the collection of images, each image is loaded only once from an input source and each image is discarded after a processing time for the image is exceeded;

(Continued)

and during the streaming, for each image in at least a first subset of the images in the collection, determining whether the image overlaps with at least one other image in the at least a first subset of the images.

19 Claims, 4 Drawing Sheets (51) Int. Cl.
  *G06F 16/51* (2019.01)
  *G06F 16/583* (2019.01)
  *G06T 7/33* (2017.01)
  *G06K 9/00* (2006.01)
  *G06K 9/46* (2006.01)
  *G06F 16/00* (2019.01)

(52) U.S. Cl.
  CPC ..... *G06F 16/5838* (2019.01); *G06K 9/00201* (2013.01); *G06K 9/00677* (2013.01); *G06K 9/4671* (2013.01); *G06K 9/6218* (2013.01); *G06T 7/33* (2017.01)

(58) Field of Classification Search
  CPC ...... G06F 16/00; G06F 16/5838; G06F 16/51; G06T 7/33
  See application file for complete search history.

(56) References Cited

U.S. PATENT DOCUMENTS

| | | | |
|---|---|---|---|
| 8,724,910 B1 | 5/2014 | Pillai et al. | |
| 8,786,680 B2* | 7/2014 | Shiratori | G06F 3/011 345/156 |
| 8,805,091 B1* | 8/2014 | Hensel | G06T 3/4038 345/629 |
| 8,818,101 B1* | 8/2014 | Lim | G06T 7/33 345/629 |
| 8,885,887 B1* | 11/2014 | Chen | G06T 7/246 345/611 |
| 8,917,951 B1* | 12/2014 | Chen | G06K 9/6202 382/218 |
| 8,965,107 B1* | 2/2015 | Schpok | G06K 9/00201 382/154 |
| 9,495,764 B1* | 11/2016 | Boardman | G06K 9/00201 |
| 2004/0190867 A1* | 9/2004 | Roelens | H04N 5/783 386/344 |
| 2006/0195475 A1 | 8/2006 | Logan et al. | |
| 2009/0303160 A1* | 12/2009 | Chew | G06F 16/51 345/55 |
| 2011/0211736 A1* | 9/2011 | Krupka | G06K 9/00677 382/118 |
| 2011/0211764 A1* | 9/2011 | Krupka | G06K 9/00677 382/225 |
| 2012/0293545 A1* | 11/2012 | Engh-Halstvedt | G06T 15/40 345/629 |
| 2013/0121600 A1 | 5/2013 | Lin et al. | |
| 2014/0270480 A1* | 9/2014 | Boardman | G06T 17/00 382/154 |
| 2014/0333644 A1* | 11/2014 | Goldman | G06T 1/60 345/545 |
| 2017/0316312 A1* | 11/2017 | Goyal | G06F 17/16 |
| 2018/0039824 A1* | 2/2018 | Asati | G06K 9/6218 |

OTHER PUBLICATIONS

Frahm et al., "Building Rome on a Cloudless Day (ECCV 2010)," Department of Computer Science, The University of North Carolina at Chapel Hill, pp. 1-14 (Retrieved Aug. 1, 2016).
Schaffalitzky et al., "Multi-View Matching for Unordered Image Sets, or How Do I Organize my Holiday Snaps?," Robotics Research Group, University of Oxford, Computer Vision, Springer, pp. 414-431 (2002).
Isenburg et al., "Streaming Meshes," Visualization, 2005, Vis 05, IEEE, pp. 231-238 (2005).
Snavely et al., "Photo Tourism: Exploring Photo Collections in 3D," Siggraph, pp. 1-12 (2006).
Nister et al., "Scalable Recognition with a Vocabulary Tree," Computer Vision and Pattern Recognition, vol. 2, pp. 1-8 (2006).
Stewenius et al., "Recent Developments on Direct Relative Orientation," Journal of Photogammetry and Remote Sensing, vol. 60, pp. 284-294 (2006).
Irschara et al., "Towards Wiki-Based Dense City Modeling," International Conference on Computer Vision Workshop on Virtual Representations and Modeling of Large-Scale Environments, pp. 1-8 (2007).
Chum et al., "Total Recall: Automatic Query Expansion with a Generative Feature Model for Object Retrieval," Computer Vision 2007, ICCV 2007, IEEE 11th International Conference, pp. 1-8 (2007).
Snavely et al., "Modeling the World from Internet Photo Collections," Springer Science and Business Media, LLC, pp. 1-22 (2007).
Raguram et al., "A Comparative Analysis of RANSAC Techniques Leading to Adaptive Real-Time Random Sample Consensus," ECCV, pp. 500-513 (2008).
Jegou et al., "Hamming Embedding and Weak Geometric Consistency for Large Scale Image Search," ECCV 10th European Conferene on Computer Vision, Springer, pp. 304-317 (Oct. 2008).
Li et al., "Modeling and Recognition of Landmark Image Collections Using Iconic Scene Graphs," Computer Vision, Springer Berlin Heidelberg, pp. 427-440 (2008).
Agarwal et al., "Building Rome in a Day," ICCV, pp. 1-8 (2009).
Turcot et al., "Better Matching with Fewer Features: The Selection of Useful Features in Large Database Recognition Problems," ICCV Workshop on Emergent Issues in Large Amounts of Visual, pp. 1-8 (2009).
Heath et al., "Image Webs: Computing and Exploiting Connectivity in Image Collections," Stanford University, Nokia Research, Palo Alto, CA, pp. 1-8 (2010).
Agarwal et al., "Building Rome in a Day," Communications of the ACM, vol. 54, No. 10, pp. 105-112 (Oct. 2011).
Chum et al., "Total Recall II: Query Expansion Revisited," Center for Machine Perception, Department of Cybernetics, Faculty of Electrical Engineering, Czech Technical University in Prague, pp. 889-896 (2011).
Arandjelovic et al., "Three Things Everyone Should Know to Improve Object Retrieval," Department of Engineering Science, University of Oxford, pp. 2911-2918 (2012).
Raguram et al., "Improved Geometric Verification for Large Scale Landmark Image Collections," Department of Computer Science, University of North Carolina, pp. 1-11 (2012).
Lou et al., "MatchMiner: Efficient Spanning Structure Mining in Large Image Collections," Department of Computer Science, Cornell University, pp. 1-14 (2012).
Crandall et al., "SfM with MRFs: Discrete-Continuous Optimization for Large-Scale Structure from Motion," PAMI, vol. 35, No. 12, pp. 1-14 (2013).
Klingner et al., "Street View Motion-from-Structure-From-Motion," ICCV, pp. 1-8 (2013).
Wu, "Towards Linear-Time Incremental Structure from Motion," University of Washington, pp. 1-8 (2013).
Havlena et al., "VocMatch: Efficient Multiview Correspondence for Structure from Motion," Institute of Geodesy and Photogrammetry, ETH Zurich, Switzerland, Springer, pp. 46-60 (2014).
Heinly et al., "Correcting for Duplicate Scene Structure in Sparse 3D Reconstruction," ECCV—European Conference on Computer Vision, pp. 1-16 (Sep. 2014).

* cited by examiner

METHODS, SYSTEMS, AND COMPUTER READABLE MEDIA FOR IMAGE OVERLAP DETECTION

PRIORITY CLAIM

This application claims the benefit of U.S. Provisional Application Ser. No. 62/137,870, filed Mar. 25, 2015, the disclosure of which is incorporated herein by reference in its entirety.

GOVERNMENT INTEREST

This invention was made with government support under Grant Nos. IIS-1252921, IIS-1349074, and CNS-1405847 awarded by the National Science Foundation and Grant No. W911NF-14-1-0438 awarded by the United States Army/Army Research Office. The government has certain rights in the invention.

TECHNICAL FIELD

The subject matter herein generally relates to image based reconstruction from image collections, and more particularly, to methods, systems, and computer readable media for image overlap detection using stream processing.

BACKGROUND

For decades, modeling the world from images has been a major goal of computer vision, enabling a wide range of applications including virtual reality, image-based localization, and autonomous navigation. One of the most diverse data sources for modeling is Internet photo collections, and the computer vision community has made tremendous progress in large-scale structure from motion (LS-SfM) from Internet datasets over the last decade. However, utilizing this wealth of information for LS-SfM remains a challenging problem due to the ever-increasing amount of image data. For example, it is estimated that 10% of all photos have been taken in the last year alone [26]. In a short period of time, research in large-scale modeling has progressed from modeling using several thousand images [21, 22] to modeling from city-scale datasets of several million [7]. Major research challenges that these approaches have focused on are:

Data Robustness: Enable the modeling from unorganized and heterogeneous Internet photo collections.
Compute & Storage Scalability: Achieve efficiency to meet the true scale of Internet photo collections.
Registration Comprehensiveness: Identify as many camera-to-camera associations as possible.
Model Completeness: Build 3D scene models that are as extensive and panoramic as possible.

In practice, these goals have been prioritized differently by existing LS-SfM frameworks [21, 22, 2, 1, 7]. The approach of Frahm [7] has emphasized scalability to enable modeling from millions of images. While it achieves impressive city-scale models, this emphasis leads to limitations in the model completeness. In contrast, the approach of Agarwal [2, 1] prioritizes model completeness, but can only model from hundreds of thousands of images, instead of millions.

SUMMARY

Methods, systems, and computer readable media for image overlap detection. In some examples, a method includes identifying, by one or more computers, a collection of images; streaming, by the one or more computers, each image from the collection of images so that, in a pass through the collection of images, each image is loaded only once or a limited number of times from an input source and each image is discarded after a processing time for the image is exceeded; and during the streaming, for each image in at least a first subset of the images in the collection, determining whether the image overlaps with at least one other image in the at least a first subset of the images. The processing time can be exceeded, e.g., when the related image extraction has been performed for the image, potentially with a limited processing budget, and/or when the image is deemed not needed for further operations.

The subject matter described herein may be implemented in hardware, software, firmware, or any combination thereof. In some examples, the subject matter described herein may be implemented using a computer readable medium having stored thereon computer executable instructions that when executed by the processor of a computer control the computer to perform steps.

Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single computing platform or may be distributed across multiple computing platforms.

BRIEF DESCRIPTION OF THE DRAWINGS

The subject matter described herein will now be explained with reference to the accompanying drawings of which.

DETAILED DESCRIPTION

This specification describes a structure from motion framework that advances the state of the art in scalability from city-scale modeling to world-scale modeling (several tens of millions of images) using just a single computer. Although a single computer can execute the methods framework, a distributed computing system can also be used. Moreover, the approach does not compromise model completeness, but achieves results that are on par or beyond the state of the art in efficiency and scalability of LS-SfM systems.

The framework achieves this level of scalability by adopting a streaming-based paradigm for geometric connected component discovery. Moreover, given the constantly increasing size of available photo collections, streaming-based processing is posited as a compute paradigm for world-scale structure from motion (WS-SfM). In order to achieve a balance between registration comprehensiveness and data compactness, the system can employ an adaptive online iconic clustering approach based on an augmented bag-of-words representation. The new image cluster representation overcomes several limitations of previous representations, which tended to partition images of the same scene into multiple independent models. In achieving more large-scale scene integrity, the cluster representation also avoids needlessly increasing the size of the indexing structure, which previously prohibited the use of datasets of tens of millions of images. The system can use a highly efficient scheme for identifying overlapping connected components in image sets, enabling efficient WS-SfM. The system need not require known geo-location of the images.

Figure 1:
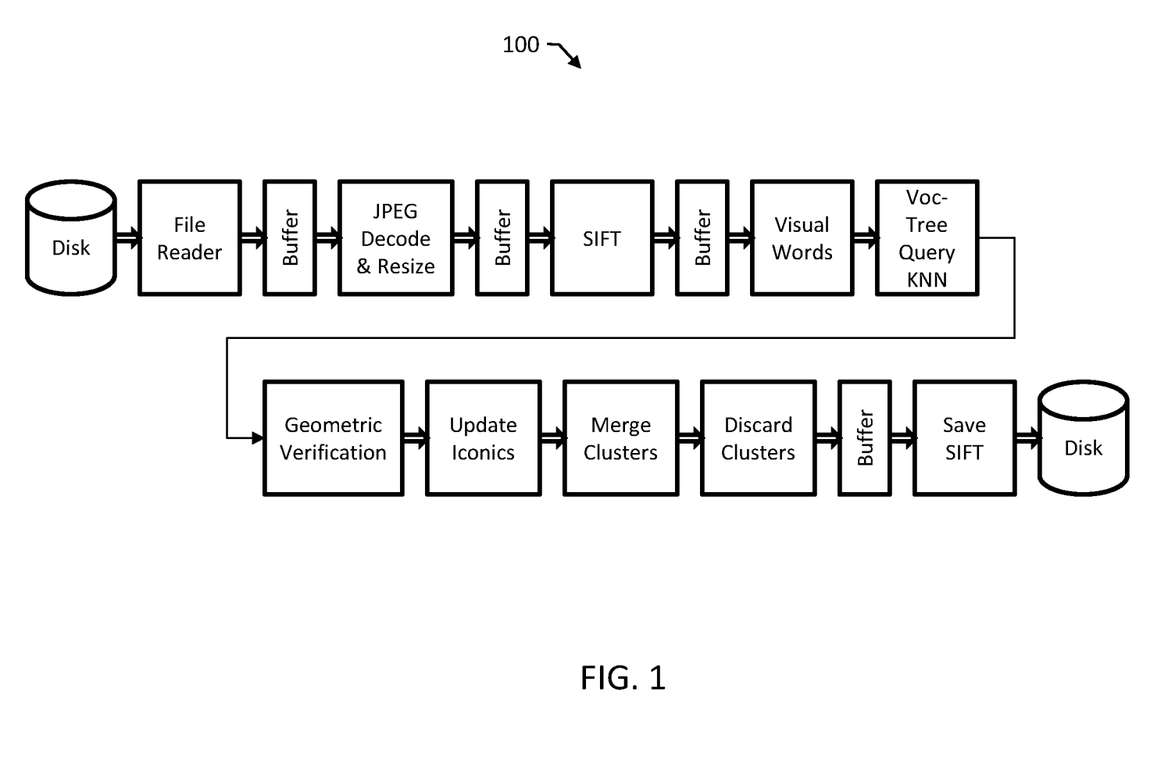
FIG. 1 is a diagram illustrating a pipeline of a method for identifying overlapping images.

FIG. 1 is a diagram illustrating a pipeline of a method for identifying overlapping images. A system of one or more computers can be configured by appropriate programming to execute the pipeline. To achieve the goal of efficient world-scale reconstruction, the system is configured to efficiently identify overlapping images of each captured scene. Next, the connected components of the dataset, formed by the overlapping images, have to be detected to prepare for the camera registration.

The major challenge for WS-SfM is the massive amount of imagery. City-scale data processing algorithms [2, 1, 7] already spend significant effort on efficient representations to maintain performance. To achieve greater efficiency for image overlap detection in world-scale datasets, we propose an efficient method for processing images in a sequential fashion (streaming). Streaming imposes the constraint on the processing that, in one or a limited number of passes through the data, an image is only loaded once or a limited number of times from disk (or other input source) and the image is discarded after deemed unnecessary or after a limited period of time (much smaller than the overall computation time). The efficiency of streaming methods for big data has long been known, for example, in mesh processing [12]. The major challenge posed by stream processing for image overlap detection is to ensure that overlap is detected even when the images are not concurrently loaded. To meet these constraints, the system can maintain and update in realtime a concise representation of a current knowledge of the images' connectivity. Upon discovering the sets of connected images (referred to as connected components), the system can then perform incremental SfM to recover the 3D geometry of the scenes contained within the dataset. In the pipeline for streaming, the input images are read and processed in batches to limit the overhead of frequent processing synchronization.

Clustering & Connected Component Discovery

The system is configured to identify images that view the same scene. In the spirit of Frahm et al. [7], the system can be configured to discover clusters of similar images. Each of these clusters is then represented by its iconic image. In this context, in order for an image to belong to a cluster, it must register to the iconic image of that cluster—i.e., there has to be a valid epipolar geometry between the iconic and the image (geometric verification). An additional layer can be added to this representation by adding connected components, which are connected clusters, that is, clusters of the same scene for which images exist that establish an epipolar geometry between the iconics. The connected components are formed whenever an image registers to multiple iconics.

To perform the cluster and connected component analysis in our streaming approach, the system can process the images in batches. The images of the first batch are used as initial iconics; in other words, the first batch represents scene view points. Note that these initial clusters will be merged or discarded, as appropriate, in the later processing. Hence, even if they are not suitable iconics, they do not impair the results. For every following batch we perform Algorithm 1, which will be detailed in the next sections.

| Algorithm 1 Cluster & Connected Component Processing |
|---|
| 1:   for all batches $b_j$ do |
| 2:      for all images I in current batch $b_j$ do |
| 3:         Compute k-nearest neighbor iconics of I |
| 4:         for all Register image I to k-nearest iconics do |
| 5:            if I registers to 1 neighbor iconic then |
| 6:               Add I to the iconic's cluster |
| 7:            else if I registers to ≥ 2 iconics then |
| 8:               Add I to best matching iconic's cluster |
| 9:               Join matched iconics into component |
| 10:           else |
| 11:              I is added as a new iconic |

Image Overlap Detection

The system can be configured for the detection of pairwise image overlap and the discovery of the connected components. The two objectives can be combined into a unified computation, which allows higher data throughput at greatly reduced computational complexity. The system uses the iconic images,—more specifically, their augmented features—to represent the currently known state of the scene within the system. The system can leverage an iconic's augmented features indexed by a vocabulary tree or any appropriate index to represent its surrounding visual information. During the streaming of the images in the photo collection, every newly loaded image uses the vocabulary tree to query for its k-nearest neighbors. For example, a system developer can chose k=25. In order to verify that these nearest neighbors overlap with the new image, the system can perform geometric verification. For efficient geometric verification, the system can use ARRSAC [18], which is a version of RANSAC that is designed for real-time applications. Coupled with this, the system can use a 5-point essential matrix estimator [23], with estimates for the intrinsic camera parameters initialized using JPEG EXIF data whenever possible. Additionally, the system can limit the number of ARRSAC iterations to 400, for the same reasons as [7].

While geometric verification can be performed extremely efficiently [7, 19], it is still a major contributor to the computational expense of a structure from motion system. Not all retrieved nearest neighbors are equally valuable for image overlap detection (a similar observation was made by Lou et al. [16]). For example, an image connecting other images whose connection has already been established does not need to be matched to both the retrieved images. Leveraging this observation, the system can set a budget $k_v < k$ for geometric verification and only evaluate the $k_v$ most relevant nearest neighbors. Our strategy is to first spend the $k_v$ match budget per image on the nearest neighbors that are ranked the highest in the k retrieval results. However, once a successful match is achieved and there is a remaining budget, further matches are only performed on nearest neighbors that do not belong to the same connected component. Intuitively, this fosters registration to a new iconic that is not already related to the new image through any component. Accordingly, matches can be prevented that strengthen intra-component connections, instead seeking to bridge matches between disjoint components. A different strategy was used in MatchMiner [16], as well as the first phase of the method of Image Webs [9].

During the above processing, the system can discover any connections of the new image matches to the current set of iconics. To properly index the image in the dataset, the system can link the new image to an iconic, e.g., by linking it to the iconic with which the new image has the greatest number of inliers.

Iconic Representation and Selection

While the system can leverage the idea of iconic images representing clusters of images from Li et al. [15] and Frahm et al. [7], their use of the GIST descriptor results in the clusters covering a small distribution of images around a particular viewpoint and at similar lighting condition. Moreover, GIST-based clustering has very limited ability to cope with occlusions, which are frequent in Internet photo collections. To control the complexity of the representation, the system can use a new cluster representation that covers a broader set of views. Defining a cluster representation is equivalent to an image retrieval problem. There have been a number of approaches that leverage the idea of query expansion or relevance feedback to improve the quality and breadth of the retrieved results [16, 4, 2, 1, 7]. Generally speaking, these methods retrieve a subset of results, and then based on what was returned, a new query is issued to find an enhanced set. An alternative strategy to enhance retrieval results is database-side feature augmentation [24, 3]. These methods leverage a static dataset to extend an image's bag-of-words representation with the representations of its geometrically verified neighbors. The system can use database-side augmentation to achieve high efficiency by not incurring the expense of reissuing queries.

The database-side feature augmentation [24, 3] is applied to the dynamic set of currently known images. The image overlap detection uses a vocabulary tree for indexing the currently known iconic images. The system can represent an iconic by its augmented visual words in the vocabulary tree. Specifically, every time a new image is linked to an iconic, the system can add the visual words of the new image's inlier features to the set of visual words belonging to the iconic. Each feature in an iconic image then tracks the visual words with which it has been associated. Associations are determined either by original assignment or via an inlier match to a new image linked to the cluster.

For efficiency and sparseness of representation, the system can limit the augmentation to only include those visual words that have not already been associated with the iconic feature to which they were an inlier. This prevents an unnecessary bias toward the current set of inlier features, allowing the other features in the image to more readily be used for retrieval. In addition to improving the quality of retrieval results, the iconic augmentation can also be viewed as overcoming quantization artifacts of the vocabulary tree. For instance, if a feature is nearly equidistant to two or more visual words, that feature can be associated with those visual words once it becomes an inlier match to an image that had a different visual word assignment for a similar feature.

Conceptually, the iconics represent the images assigned to their clusters. Hence, if we encounter a new image that does not register to any current iconic, we consider it to be representing an as-yet unknown scene or scene part. This new image temporarily represents a new cluster until further images are added to the cluster. Taking inspiration from Frahm et al. [7], the system can select the permanent iconic after the cluster has grown to contain c images (c=3 for all our experiments). The permanent iconic of the cluster is selected as the cluster image with the highest number of inliers to the other images in the cluster, i.e. the one with the highest number of features in common with the remaining images in the cluster.

Cluster Merging

During the above process of creating new iconics, it is possible that two iconics are created for essentially the same scene content. For instance, this can most easily be seen for the first batch of images whose images automatically become iconics without being evaluated for mutual overlap. Other cases of similar iconics could result from retrieval failures or due to the limited compute budget $k_v$ in the verification of the retrieved candidates. Retrieval failures result in the ideal iconic not being retrieved due to quantization artifacts, a high amount of occlusion, or other confusing visual words being present in the image. The limited computation budget can lead to non-evaluated relevant iconics. To overcome these limitations imposed by the retrieval and the limited compute budget, the system can perform a cluster merging step in which iconic pairs that may be similar attempt geometric verification. A first indication that a pair of iconics may be similar is when a new image successfully registers to two iconics. To handle the case where the iconics reside in the same connected component (since the system can prevent duplicate matches to the same connected component), the system can also look at the order of retrieval results. If a new image matches to one of the first r iconic retrieval results, and those retrieval results all belong to the same connected component, the system can flag these iconics as candidate clusters for merging (in our experiments, we set r=3).

Once the system has found the candidate clusters to merge, the system can sort them by size, so that the system can merge the smallest cluster first. The reasoning for this is that it may be useful to maintain a compact and concise iconic set, and merging two smaller clusters increases the average iconic-to-cluster image ratio more than merging a small cluster with a large one. If the iconics for a pair of candidate clusters register, the images and iconic from the smaller of the two clusters are appended to the larger cluster and the iconic's representation is augmented. This merging fosters that, over time, the scene representation stays as compact as possible.

World-Scale Data Management

Unordered world-scale photo collections pose significant challenges for data storage and, in general, cannot be maintained in random access memory. A critical effort is to develop an efficient strategy of data association and for the pruning of unrelated images. The system can measure the increase of information of a cluster in order to decide on its importance for the world-scale scene representation. This strategy enables the streaming approach and improves the efficiency for handling world-scale data of arbitrary size.

To ensure memory efficiency, the data associated with an image (SIFT features, visual words, camera intrinsics) is stored in memory only for the period of time that the data is needed. For instance, an iconic image could be matched to at any point, so its SIFT features should be readily available. Alternatively, if an image registers to a cluster that has already undergone its iconic selection phase, then the data for that image can be discarded, as the image will not be used for any further match attempts. Therefore, the system can keep in memory all data for iconic images, plus for cluster images that belong to clusters of size less than c.

Once a cluster has passed the iconic selection phase, the system can discard all image information from that cluster except that which pertains to its iconic. For large or diverse datasets, this may still overreach the memory resources, as the number of iconics could continually increase.

To circumvent this problem, the system can limit the number of images we store in memory by enforcing a minimum information growth rate for each cluster. The motivation for this measure comes from the observation that, with increasing size of the cluster, the scene coverage saturates. Hence, as the rate of scene growth decreases, additional images are less important for representing the scene, and we consider the clusters saturated if the increase of information is too slow. This rate of growth is enforced by computing the ratio between a cluster's current size and the total number of images that have been processed since the cluster's creation. If this ratio falls below a threshold 1/d (set to 1/50,000 in tests), the system can discard the cluster's image information from memory. Note that the system can still track that it belongs to its connected component—the system can just prevent it from growing any further. A side benefit of this strategy is that it naturally limits the lifetime of unrelated/single images, as a single image cluster will persist only until d images have been processed.

Additionally, the strategy for discarding clusters helps to eliminate bad iconics. For instance, the case may exist where two iconics show similar content, but fail to register to each other (and thus do not merge). If one of the iconics has a low-quality set of features or visual words, and if no better option was available during the iconic selection phase, then its cluster size will be significantly smaller than the iconic with a high-quality, repeatable representation. Therefore, as processing continues, the smaller cluster, and lower-quality iconic, will be discarded as the higher-quality iconic registers an increasing number of images.

Choosing the growth parameter d immediately influences the probability to find overlapping images in the dataset. This in fact controls the minimum size $c_m$ of a connected component that can be reliably discovered. Next, it may be useful to determine c for allowing a sensible choice for d. Assume that every image within a connected component can successfully register to every other image of the component. While this assumption does not fully hold in practice, especially for connected components that have a wide spatial coverage, this assumption is much more reasonable for a single cluster of images. Additionally, assume that the images for the connected component are randomly dispersed throughout the entire dataset of size n. If the $c_m$ images are dispersed in the worst case, the average number of images between them in the input ordering is the greatest (i.e. the c images occur at intervals of $n/c_m$). Then, finding matches between the images is only possible if the d is large enough to preserve images in memory for that duration. Specifically, d would have to be set such that $d>n/c_m$. Therefore, for a dataset that contains 10 million images, and with d=50,000, it is possible that the system can reliably recover connected components (or clusters) of size >200 images. In experiments, the smallest d that ensures a recoverable cluster size of 200 images was chosen.

Structure from Motion

To generate structure from motion (SfM) models, the system can leverage the connected components already discovered during the streaming phase, but densify the connections in order to allow for more accurate and complete reconstruction. This provides a significant advantage over previous methods such as Frahm et al. [7] by not burdening our structure from motion processing with cluster or iconic matching, which can be a significant effort for tens or hundreds of thousands of iconics as encountered in our processing. Note the amount of iconics that we obtain is at the scale of the number of images processed in previous methods such as Agarwal et al. [2, 1]. For increased performance and stability the system can perform a separate hierarchical structure from motion process for each connected component by first building a skeletal reconstruction based on the iconics of clusters with more than three images and a few linking images for those iconics. Then, the system can register the remaining images with respect to the skeletal reconstruction.

For the reconstruction from the iconics it is important to note that for the sparseness of the representation in the streaming, iconics should be a sparse representation of the scene and hence they may not match densely with each other. Hence, to foster reconstruction the system can first densify the set of images to allow the reconstruction. The system can use the connectivity of the linking images to select additional images. This connectivity is already known from the stream processing and hence readily available without additional computation.

The system can chose the additional images to be those images with connections to multiple iconics, so that each iconic is connected to as many other iconics as possible. To quantify the connectivity during the addition of the linking images, the system can track this connectivity by creating a sparse adjacency matrix M. Each entry $m_{i,j}$ of matrix M will store the number of connections between iconic i and iconic j. At first the system can test for connection with the 50 nearest neighbors of each iconic within the current iconic set using vocabulary tree image retrieval and geometric verification. Based on the results of these match attempts, the system can update M to have an entry of 1 wherever two iconics successfully matched. As the iconics are very disjoint, M is by design still very sparse after this step.

To increase the density of M, the system can turn to the linking images within our dataset. Here, a potentially beneficial connecting image is any image that registered to two or more other images during the streaming process (i.e. an image that matched to and connected two iconics). The system can add a subset of these connecting images to our current iconic set, such that we are left with a set of images that is well-connected and ready for reconstruction.

In order to discover the subset of connecting images to use for reconstruction the system can employ a greedy strategy which adds connecting images based on the number of iconics to which they register. The system can compute this number by first matching each connecting image to its 10 nearest neighbors in the iconic set (once again using the vocabulary tree). Then, the system can rank the connecting images by the number of new connections that they add, and greedily select the ones with the most new connections. The system can continue until there are either no connecting images left, or the connecting images no longer provide new links between iconics.

After preparing all connected components for reconstruction, the system can then process them in parallel using structure from motion software. Once structure from motion provides a sparse 3D model for each connected component, the system can register the remaining connected component images to this model using a structure from motion. To avoid the challenges of symmetric scene structures the system can leverage the work by Heinly [10] for its robustness, and the system can be optimized for the implementation to achieve higher processing times. It should be understood that further passes through the data could be used to find additional images connecting the established models, connected components, or augmented iconic representations.

Figure 3:
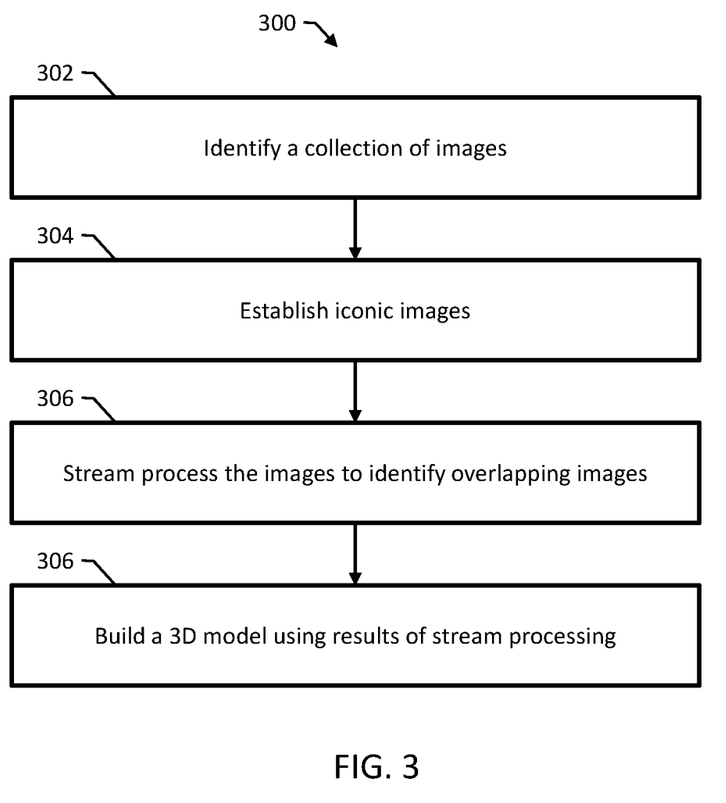
FIG. 3 is a flow diagram of an example method for processing images.

FIG. 3 is a flow diagram of an example method 300 for processing images. A system of one or more computers can be configured by appropriate programming to perform the method 300. For purposes of illustration, the method 300 will be described with respect to a system that performs the method 300.

The system identifies a collection of images (302). The collection may include a very large number of images, which can make it impractical to perform excessive processing on each image. In some examples, the collection frequently has images added to it, which can make it impractical to spend an excessive amount of time processing the collection.

The system establishes a plurality of iconic images for the collection in an initial pass through the collection (304). For example, the system can stream process a first batch of images in the collection. The system can determine visual words based on the images and use a vocabulary tree to index the visual words so that the system can later query the vocabulary tree to find nearest neighbor iconic images for geometric comparison with later processed images.

The system stream processes the collection of images (306). The system loads each image once in a pass, e.g., by loading each image from slower storage such as a hard disk to faster storage such as random access memory (RAM). The system allocates a processing budget to each image and can enforce that budget in any appropriate way. When the system reaches a processing threshold for a given image or the given image is deemed unnecessary, the image is discarded, e.g., by flushing the image from the faster storage.

The system determines, for each image, a number of nearest neighbor iconic images using the vocabulary tree and visual words for the image, and then determines a number of matches between the image and the nearest neighbor iconic images, e.g., by performing geometric verification on the image with respect to the nearest neighbor iconic images. If the image matches no nearest neighbor iconic images, then the system establishes a new iconic image based on the image. If the image matches one nearest neighbor iconic image, then the system assigns the image to an image cluster for that nearest neighbor iconic image. If the image matches two or more nearest neighbor iconic images, the system can assign the image to an image cluster associated with a best matching nearest neighbor iconic image and join the two or more nearest neighbor iconic images into a connected component.

The system builds a 3D model of at least one scene depicted in the collection of images (308). The system can use any appropriate method for building the 3D model, e.g., using large-scale structure from motion techniques. The system can output the 3D model, e.g., by displaying the 3D model on a display screen. The system can also be configured to use the results of the stream processing for performing other processing of the collection of images.

Figure 4:
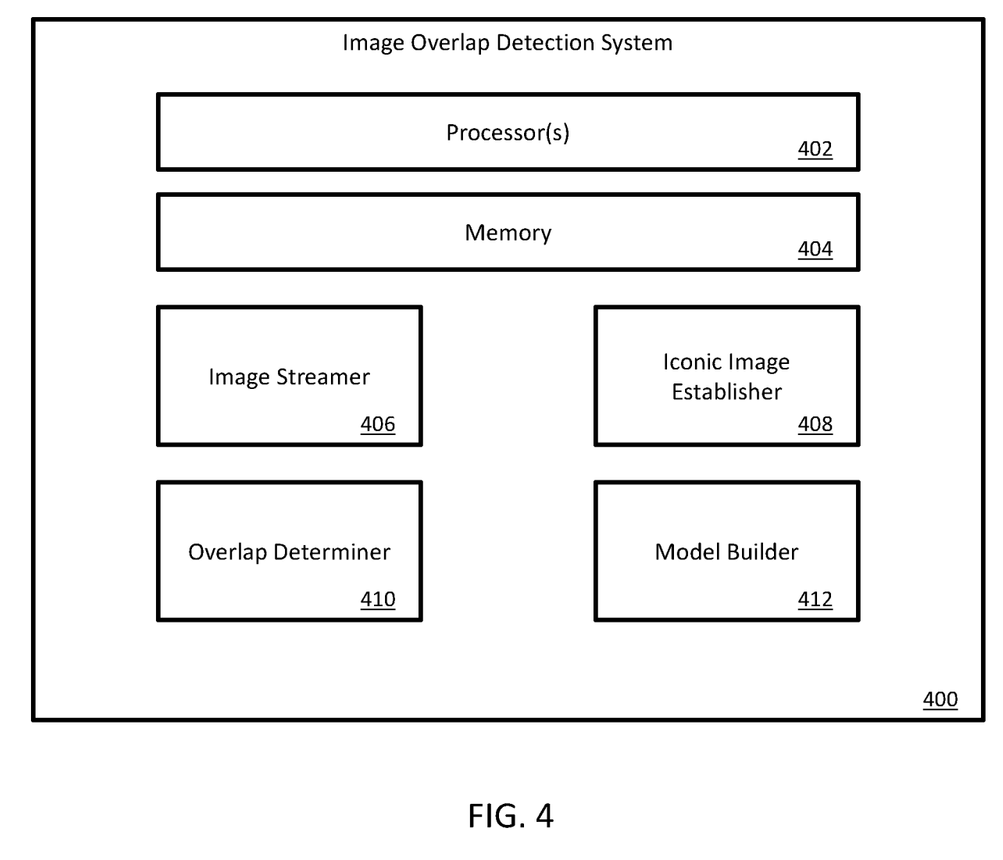
FIG. 4 is a block diagram illustrating an example system for image overlap detection.

FIG. 4 is a block diagram of an example system 400 for image overlap detection. System 400 can be configured to perform the method 300 of FIG. 3.

System 400 includes at least one processor 402 and memory 404. System 400 includes executable software modules that can be loaded into memory 404 and executed by processor 402. The executable software modules include an image streamer 406, an iconic image establisher 408, an overlap determiner 410, and a model builder 412.

Image streamer 406 is configured to identify a collection of images and stream each image from the collection so that, in one or a limited number of passes through the collection of images, each image is loaded only once from an input source and each image is discarded after a processing time for the image is exceeded. Overlap determiner 410 is configured to process images during the streaming. For each image in at least a first subset of the images in the collection, overlap determiner 410 determines whether the image overlaps with at least one other image in the first subset.

Iconic image establisher 408 is configured to execute an initial pass through at least a first batch of the collection of images and establish iconic images for the collection. Each iconic image represents a scene depicted in the collection of images. Model builder 412 is configured to build a 3D model of a scene depicted in the collection of images using results from image streamer 406 and overlap determiner 410.

Experimental Evaluation

To test this approach, the methods were ran on datasets of widely varying sizes (see Table 1), the smallest being around 74,000 images and the largest being about 53 million. Two of the datasets were obtained from the authors of previous publications [16, 7], which provide a basis of comparison between the methods.

TABLE 1

Statistics for the datasets. Iconics are for clusters of size ≥3, and the report includes the 32 largest connected components (150 components for the Yahoo dataset).

| | Number of Images | | | | | | | Time (hours) | | | |
|---|---|---|---|---|---|---|---|---|---|---|---|
| Dataset | Input | Valid | Registered | $CC_1$ | $CC_2$ | Iconics | SfM | Stream | Density | SfM | Register |
| Roman Forum [18] | 74,388 | 73,566 | 45,341 | 17,804 | 2,971 | 3,408 | 23,397 | 0.35 | 0.27 | 0.42 | 0.10 |
| Berlin [9] | 2,704,486 | 2,661,327 | 702,845 | 259,705 | 6,869 | 42,612 | 235,155 | 7.89 | 1.14 | 2.92 | 2.66 |
| Paris | 10,390,391 | 10,177,094 | 2,492,310 | 1,228,062 | 7,016 | 131,627 | 1,017,372 | 29.16 | 4.04 | 57.85 | 6.96 |
| London | 12,327,690 | 12,036,991 | 3,078,303 | 779,036 | 17,382 | 228,792 | 672,850 | 38.29 | 5.57 | 22.72 | 6.57 |
| Yahoo [2] | 53,465,264 | 50,990,089 | 848,994 | 766 | 732 | 43,842 | 16,627 | 121.63 | 0.24 | 0.87 | — |

TABLE 2

Performance of the streaming components. The rate refers to the number of images, queries (for voc-tree knn), or image pairs (geometric verification) processed per second.

| Module | # Threads | # GPUs | Rate |
|---|---|---|---|
| Read Files from Disk | 4 | | 130-225 Hz |
| Decode and Resize JPEGs | 4 | | 177 Hz |
| Compute SIFT | 8 | 8 | 138 Hz |
| Compute Visual Words | 4 | | 434 Hz |
| Query Voc-Tree KNN | 16 | | 4,475 Hz |

TABLE 2-continued

Performance of the streaming components. The rate refers to the number of images, queries (for voc-tree knn), or image pairs (geometric verification) processed per second.

| Module | # Threads | # GPUs | Rate |
|---|---|---|---|
| Geometric Verification | 16 | 8 | 261 Hz |
| Add Images to Voc-Tree | 16 | | 14,485 Hz |
| Save Verified SIFT to Disk | 3 | | 186 Hz |

The test system leveraged a mixed Matlab, C++, CUDA implementation of our proposed streaming method. For the streaming and reconstruction of all the datasets, the test system used a PC similar to the one used by Frahm et al. [7] to allow direct comparison of results. For processing the world-scale dataset [27] the test system used a dual processor computer with 256 GB of RAM and two Nvidia Titan Z graphics cards which are leveraged in the CUDA based parts of our system.

The test system used a $10^6$ visual word vocabulary tree trained on approximately 250 M SIFT features. For geometric verification, the test system enforced a minimum of 30 inlier matches in order for a pair of images to be considered successfully registered. Additionally, the test system ignored any image pair that had 70% of its inliers along the outer border of the image, as these matches were most frequently caused by watermarks. Finally, when registering cameras to the already built 3D models, the test system enforced a minimum of 50 P3P (perspective-3-point) inliers.

In general it can be observed that the computation is limited by the I/O bandwidth of the test system (see Table 1) where the test system, for most modules, only reached a sustained disk read rate of 130 Hz when reading images at about 640×480 resolution, which is lower than the processing rate of most computational modules. Accordingly, the test system could further improve its computation rate with higher I/O bandwidth computers or disk arrays.

Figure 2:
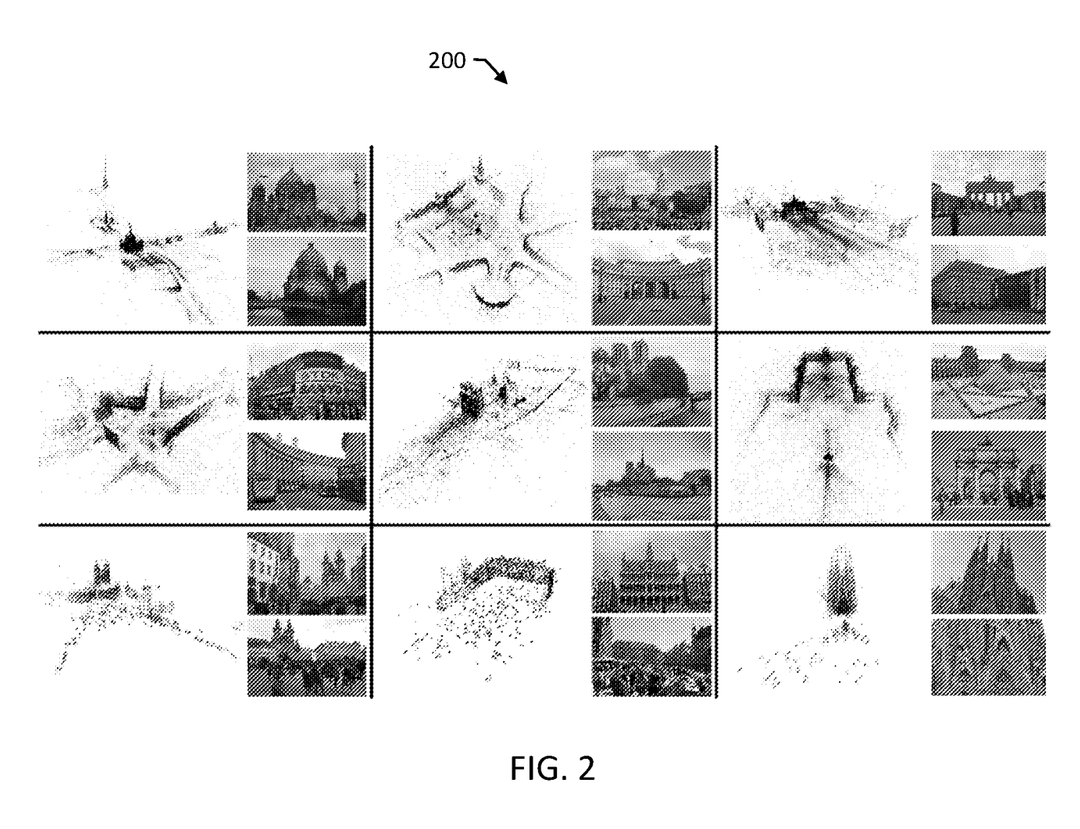
FIG. 2 is a diagram illustrating models output by the test system.

FIG. 2 is a diagram illustrating models output by the test system. From left to right, then top to bottom: Berliner Dom, Trafalgar Square, Brandenburg Gate, Piccadilly Circus, Notre Dame, Louvre, Prague, Brussels, and Sagrada Familia.

The smallest of the datasets, the Roman Forum, was previously used by MatchMiner [16]. The test system registered 45,341 images and had a connectivity entropy of 7.58 (lower is better; refer to [16] for a motivation of this measure), compared to the 40,604 registered images and 11.62 entropy of MatchMiner. In contrast to the single PC used in the test system, MatchMiner used a 53-node compute cluster and took 1.65 hours to discover the connected components in the dataset [16], whereas the single-machine system finished in 21 minutes for the streaming. There are several factors underlying the differences in results. For instance, the criteria for valid geometric verification (i.e. minimum required number of inliers were not reported by MatchMiner [16]) may have been different between the approaches. Additionally, MatchMiner used a much higher match budget, allowing an average of 20 match attempts per image, whereas the test system used $k_v=2$ for this and all other experiments to ensure comparability across the different datasets. The test system does employ GPU computation for SIFT extraction and SIFT descriptor matching (leading to greater efficiency in these modules), however Match-Miner does not include SIFT extraction and visual word computation in their timings, further emphasizing the efficiency of our approach.

The second smallest dataset, Berlin, Germany, contains 2.7 million images and was obtained from the authors of Frahm et al. [7]. It was reported [7] that, in the structure from motion of Frahm et al., 63,905 images were registered overall for the dataset. The largest reconstructed model contained 5671 images. In contrast, the test system registers an order of magnitude more images (702,845 or 26%) from the same data. When considering only the images registered to the 32 biggest reconstructed 3D models, the test system registered 235,155 images, which is almost fourfold the number of overall images registered by Frahm et al. [7]. The largest obtained 3D model from Berlin (shown in FIG. 2) contains 35,250 images. The model is close to a kilometer long in the longest direction. This significantly higher registration rate is a result of significantly improved cluster representation and the streaming computation that readily obtains connected components. Frahm et al. report a computation time of 20.32 hours for the structure from motion part of their system. On the comparable machine, the test system achieved a processing time of 14.61 hours for registering more than an order of magnitude more images for the same dataset.

The third and fourth datasets were datasets from Paris, with 10.3 million images, and from London, with 12.3 million. Both datasets were downloaded from Flickr. It can be seen that in both datasets the system reaches a registration rate of around one quarter of the images (Paris 24% registration rate and London 26%) which is similar to the 26% registration rate for the Berlin dataset. It can be seen that the computation rates for these datasets are also scaling linearly (less than 6% variation from linear). This underlines the scalability of the method that reconstructs from an order of magnitude more image data than previously proposed methods while reaching state-of-the-art model completeness.

To demonstrate the true world scale processing, the test system processed 53 million images spanning the globe from the Yahoo webscope dataset [27]. The processing time was approximately 5.1 days. Example models are shown in FIG. 2. This clearly demonstrates the scalability of the system enabling building the world in six days on a single computer. While the test system did register almost 850,000 images, the generated reconstructions were rather small. The reason for this is that over 99% of the connected components had fewer than 15 images. Therefore, the test system skipped the iconic-based reconstruction, and instead used all of the images in the connected components directly.

REFERENCES

The disclosure of each of the following references is hereby incorporated herein by reference in its entirety.

[1] S. Agarwal, Y. Furukawa, N. Snavely, I. Simon, B. Curless, S. Seitz, and R. Szeliski. Building Rome in a Day. *Comm. ACM,* 2011.

[2] S. Agarwal, N. Snavely, I. Simon, S. Seitz, and R. Szeliski. Building Rome in a Day. *ICCV,* 2009.

[3] R. Arandjelović and A. Zisserman. Three Things Everyone Should Know to Improve Object Retrieval. *CVPR,* 2012.

[4] O. Chum, A. Mikulik, M. Perdoch, and J. Matas. Total Recall II: Query Expansion Revisited. *CVPR,* 2011.

[5] O. Chum, J. Philbin, J. Sivic, M. Isard, and A. Zisserman. Total recall: Automatic query expansion with a generative feature model for object retrieval. In *Computer Vision, 2007. ICCV 2007. IEEE 11th International Conference on,* pages 1-8. IEEE, 2007.

[6] D. Crandall, A. Owens, N. Snavely, and D. Huttenlocher. SfM with MRFs: Discrete-Continuous Optimization for Large-Scale Structure from Motion. *PAMI*, 35(12), 2013.
[7] J. Frahm, P. Fite-Georgel, D. Gallup, T. Johnson, R. Raguram, C. Wu, Y. Jen, E. Dunn, B. Clipp, S. Lazebnik, and M. Pollefeys. Building Rome on a Cloudless Day. *ECCV*, 2010.
[8] M. Havlena and K. Schindler. VocMatch: Efficient Multiview Correspondence for Structure from Motion. *ECCV*, 2014.
[9] K. Heath, N. Gelfand, M. Ovsjanikov, M. Aanjaneya, and L. Guibas. Image Webs: Computing and Exploiting Connectivity in Image Collections. *CVPR*, 2010.
[10] J. Heinly, E. Dunn, and J. Frahm. Correcting for Duplicate Scene Structure in Sparse 3D Reconstruction. *ECCV*, 2014.
[11] A. Irschara, C. Zach, and H. Bischof. Towards Wiki-Based Dense City Modeling. In *International Conference on Computer Vision (ICCV) Workshop on Virtual Representations and Modeling of Large-Scale Environments (VRML)*, 2007.
[12] M. Isenburg and P. Lindstrom. Streaming meshes. In *Visualization, 2005. VIS 05. IEEE*, pages 231-238. IEEE, 2005.
[13] H. Jégou, M. Douze, and C. Schmid. Hamming Embedding and Weak Geometric Consistency for Large Scale Image Search. *ECCV*, 2008.
[14] B. Klingner, D. Martin, and J. Roseborough. Street View Motion-from-Structure-from-Motion. *ICCV*, 2013.
[15] X. Li, C. Wu, C. Zach, S. Lazebnik, and J.-M. Frahm. Modeling and recognition of landmark image collections using iconic scene graphs. In *Computer Vision—ECCV 2008*, pages 427-440. Springer Berlin Heidelberg, 2008.
[16] Y. Lou, N. Snavely, and J. Gehrke. MatchMiner: Efficient Spanning Structure Mining in Large Image Collections. *ECCV*, 2012.
[17] D. Nister and H. Stewenius. Scalable recognition with a vocabulary tree. In *Computer Vision and Pattern Recognition, 2006 IEEE Computer Society Conference on*, volume 2, pages 2161-2168. IEEE, 2006.
[18] R. Raguram, J. Frahm, and M. Pollefeys. ARRSAC: Adaptive Real-Time Random Sample Consensus. *ECCV*, 2008.
[19] R. Raguram, J. Tighe, and J.-M. Frahm. Improved Geometric Verification for Large Scale Landmark Image Collections. In *BMVC*, 2012.
[20] F. Schaffalitzky and A. Zisserman. Multi-view matching for unordered image sets, or how do i organize my holiday snaps?. In *Computer Vision ECCV 2002*, pages 414-431. Springer, 2002.
[21] N. Snavely, S. Seitz, and R. Szeliski. Photo Tourism: Exploring Photo Collections in 3D. *SIGGRAPH*, 2006.
[22] N. Snavely, S. Seitz, and R. Szeliski. Modeling the World from Internet Photo Collections. *IJCV*, 2007.
[23] H. Stewenius, C. Engels, and D. Nistér. Recent Developments on Direct Relative Orientation. *Journal of Photogrammetry and Remote Sensing*, 2006.
[24] P. Turcot and D. Lowe. Better Matching with Fewer Features: The Selection of Useful Features in Large Database Recognition Problems. *ICCV Workshop on Emergent Issues in Large Amounts of Visual Data (WS-LAVD)*, 2009.
[25] C. Wu. Towards Linear-time Incremental Structure from Motion. *3DV*, 2013.
[26] 1000 memories blog. http://blog.1000memories.com.
[27] Yahoo! webscope. 2014. yahoo! webscope dataset yfcc-100m. http://labs.yahoo.com/Academic_Relations.

What is claimed is:

1. A method of image pair overlap detection, the method comprising:
   identifying, by one or more computers, a collection of images;
   streaming, by the one or more computers, each image from the collection of images so that, in one or a limited number of passes through the collection of images, each image is loaded into memory only once from an input source and each image is discarded from the memory after a processing time for the image is exceeded; and
   during the streaming, for each image in at least a first subset of the images in the collection, determining whether the image overlaps with at least one other image in the at least a first subset of the images, including determining that a first image loaded into the memory overlaps a second image not loaded into the memory;
   wherein streaming each image and determining whether the image overlaps with at least one other image comprises executing an initial pass through at least a first batch of the collection of images and establishing a plurality of iconic images, each iconic image representing a scene depicted in the collection of images; and
   wherein determining that the first image loaded into the memory overlaps the second image not loaded into the memory comprises matching, while streaming each image from the collection of images and when the first image is loaded into the memory during stream, the first image and the second image to one of the iconic images.

2. The method of claim 1, wherein executing the initial pass through the collection of images comprises:
   determining whether a given image matches one or more nearest neighbor iconic images.

3. The method of claim 2, comprising, in response to determining that the given image matches one or more nearest neighbor iconic images, assigning the given image to an image cluster associated with one or more best matching nearest neighbor iconic images.

4. The method of claim 3, wherein assigning the given image to the image cluster comprises adding one or more visual words of inlier features of the given image to a set of visual words for the best matching nearest neighbor iconic image.

5. The method of claim 2, wherein executing the initial pass through the collection comprises, for at least a first image in the collection of images:
   determining that the first image does not match any of the nearest neighbor iconic images; and
   establishing a new iconic image based on the first image.

6. The method of claim 2, wherein executing the initial pass through the collection comprises, for at least a first image in the collection of images:
   determining that the first image matches two or more nearest neighbor iconic images; and
   merging image clusters associated with the two or more nearest neighbor iconic images.

7. The method of claim 2, wherein determining whether the given image matches the one or more nearest neighbor iconic images comprises determining one or more visual words for the given image and querying an index for the one or more nearest neighbor iconic images.

8. The method of claim 2, comprising performing geometric verification on the given image with respect to the nearest neighbor iconic images.

9. The method of claim 1, comprising building a 3D model of a scene depicted in the collection of images using results of the determining.

10. A system comprising:
    at least one processor; and
    at least one computer readable medium storing instructions that, when executed by the at least one processor, causes the at least one processor to perform operations comprising:
    identifying a collection of images;
    streaming each image from the collection of images so that, in one or a limited number of passes through the collection of images, each image is loaded into memory only once from an input source and each image is discarded from the memory after a processing time for the image is exceeded; and
    during the streaming, for each image in at least a first subset of the images in the collection, determining whether the image overlaps with at least one other image in the at least a first subset of the images, including determining that a first image loaded into the memory overlaps a second image not loaded into the memory;
    wherein streaming each image and determining whether the image overlaps with at least one other image comprises executing an initial pass through at least a first batch of the collection of images and establishing a plurality of iconic images, each iconic image representing a scene depicted in the collection of images; and
    wherein determining that the first image loaded into the memory overlaps the second image not loaded into the memory comprises matching, while streaming each image from the collection of images and when the first image is loaded into the memory during stream, the first image and the second image to one of the iconic images.

11. The system of claim 10, wherein executing the initial pass through the collection of images comprises:
    determining whether a given image matches one or more nearest neighbor iconic images.

12. The system of claim 11, the operations comprising, in response to determining that the given image matches one or more nearest neighbor iconic images, assigning the given image to an image cluster associated with one or more best matching nearest neighbor iconic images.

13. The system of claim 12, wherein assigning the given image to the image cluster comprises adding one or more visual words of inlier features of the given image to a set of visual words for the best matching nearest neighbor iconic image.

14. The system of claim 11, wherein executing the initial pass through the collection comprises, for at least a first image in the collection of images:
    determining that the first image does not match any of the nearest neighbor iconic images; and
    establishing a new iconic image based on the first image.

15. The system of claim 11, wherein executing the initial pass through the collection comprises, for at least a first image in the collection of images:
    determining that the first image matches two or more nearest neighbor iconic images; and
    merging image clusters associated with the two or more nearest neighbor iconic images.

16. The system of claim 11, wherein determining whether the given image matches the one or more nearest neighbor iconic images comprises determining one or more visual words for the given image and querying an index for the one or more nearest neighbor iconic images.

17. The system of claim 11, the operations comprising performing geometric verification on the given image with respect to the nearest neighbor iconic images.

18. The system of claim 11, the operations comprising building a 3D model of a scene depicted in the collection of images using results of the determining.

19. A non-transitory computer readable medium having stored thereon executable instructions that when executed by a processor of a computer control the computer to perform steps comprising:
    identifying a collection of images; and
    streaming each image from the collection of images so that, in one or a limited number of passes through the collection of images, each image is loaded into memory only once from an input source and each image is discarded from the memory after a processing time for the image is exceeded; and
    during the streaming, for each image in at least a first subset of the images in the collection, determining whether the image overlaps with at least one other image in the at least a first subset of the images, including determining that a first image loaded into the memory overlaps a second image not loaded into the memory;
    wherein streaming each image and determining whether the image overlaps with at least one other image comprises executing an initial pass through at least a first batch of the collection of images and establishing a plurality of iconic images, each iconic image representing a scene depicted in the collection of images; and
    wherein determining that the first image loaded into the memory overlaps the second image not loaded into the memory comprises matching, while streaming each image from the collection of images and when the first image is loaded into the memory during stream, the first image and the second image to one of the iconic images.

* * * * *